Patented Oct. 14, 1924.                                                        1,511,513

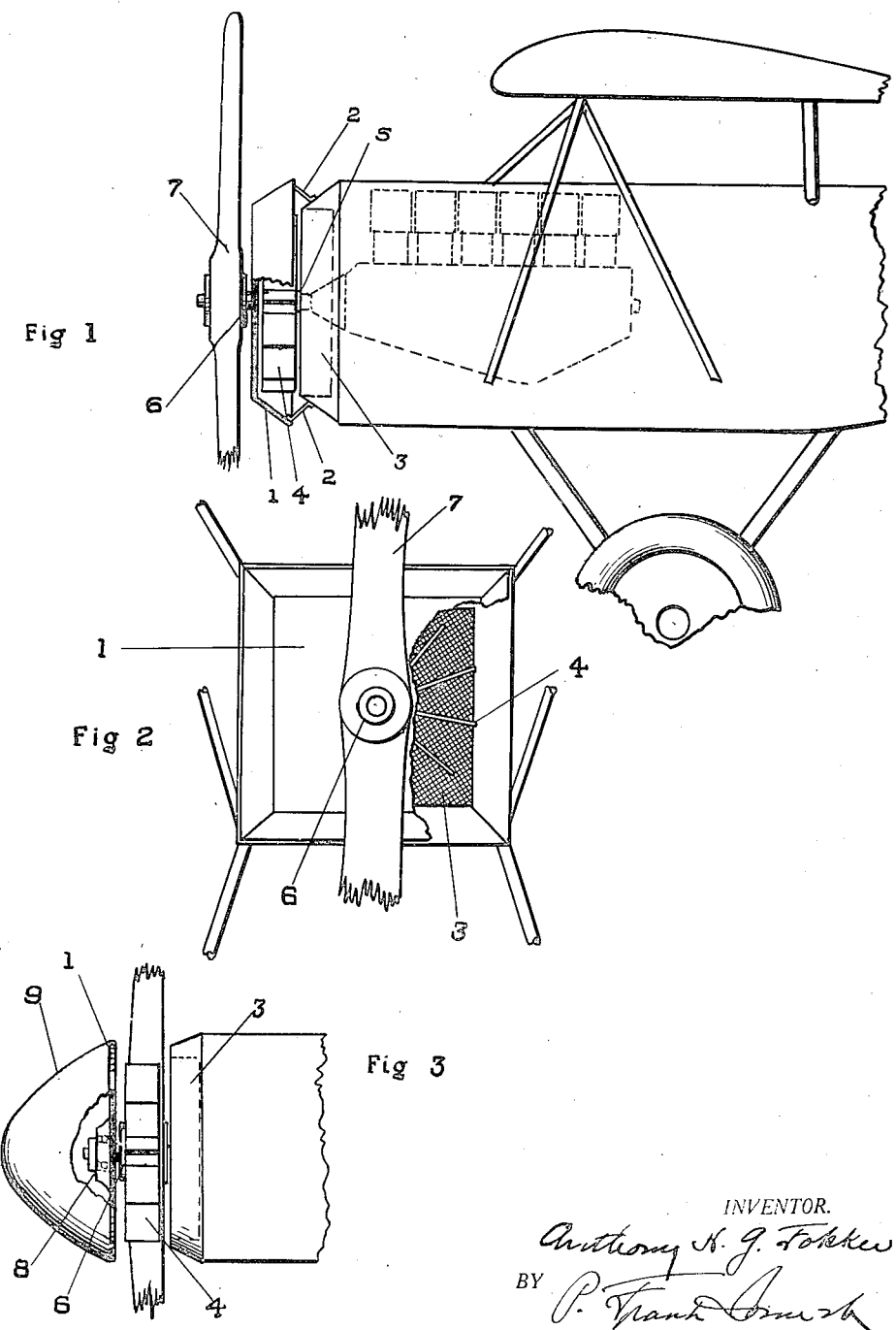

UNITED STATES PATENT OFFICE.

ANTHONY H. G. FOKKER, OF AMSTERDAM, NETHERLANDS.

ARMORED AIRCRAFT.

Application filed July 8, 1922. Serial No. 573,655.

*To all whom it may concern:*

Be it known that I, ANTHONY HERMAN GERARD FOKKER, a subject of the Kingdom of the Netherlands, residing in the city of Amsterdam, the Netherlands, have invented certain new and useful Improvements in Armored Aircraft, of which the following is a specification.

The present invention relates to improvements in aircraft and is more especially directed to means for protecting the radiators, engines and adjacent vulnerable parts of the aircraft structure against damage from the effects of gun-fire.

It is well known that the radiators through which the cooling medium for the motor circulates, are relatively light in construction and by reason of this fact and their exposed location they present ready targets to opposing marksmen. Many aircraft, particularly those of the combat types, have been disabled or destroyed owing to the vulnerability of the radiators, the damaging of which seriously impaired the functioning of the power-plant.

Numerous attempts have heretofore been made to protect the radiators by means of guards or coverings of armorplate but they have been unsuccessful owing to the fact that such devices were found to impede the passage of air through the radiators, thereby materially reducing the efficiency of the latter in maintaining those thermal conditions which are essential to dependable performance of the power-plant.

The object of the present invention is to provide a simple and economical means of protecting radiators and adjacent parts of the power-plant and aircraft structure, which, while affording a maximum degree of protection, will not in any way reduce the efficiency of the cooling system, but will rather have a tendency to improve the functioning thereof.

My invention further comprehends a means of protection having the aforesaid characteristics which may be readily installed in existing aircraft without material change in the structure thereof, or in the mounting or location of the power-plant and the propeller, thus imparting to my invention a wide range of adaptability and usefulness.

Another object of my invention is to provide a protecting medium, as aforesaid, which will be of light construction and at the same time highly resistant, and to this end said medium is formed to deflect and thereby break the penetrating force of bullets or projectiles or other missiles which may impinge against it.

Other objects and advantages of my invention will become manifest as the description proceeds, and I would have it understood that I reserve unto myself all rights to the full range of equivalents, both in structures and use, to which I may be entitled under my invention in its broadest aspect.

For the purposes of the present disclosure, I have elected to illustrate and describe certain preferred embodiments of my invention, but it will be evident to those skilled in the art that my invention may take other forms without departing from the spirit and scope thereof.

In the drawings, Figure 1 is a view in elevation of a fragment of an airplane showing my invention applied thereto, the latter being partly in section. Figure 2 is a front elevation of the structure shown in Figure 1, and, Figure 3 is a view similar to Figure 1 illustrating a modified form of my invention.

Referring now to the drawings in detail, in which like characters of reference are employed to indicate similar parts throughout the several views, and more particularly to the structure shown in Figures 1 and 2, 10 indicates the fuselage of the airplane within which the radiator 3 is mounted in the customary manner.

The engine or motor is shown in dotted line, the crank-shaft 5 thereof extending through the radiator and carrying the propeller hub 6 at its outer end, to which the propeller 7 is secured by means of bolts in the usual way.

Located between the propeller 7 and the radiator 3 is an armor-plate guard or shield for the radiator and the adjacent associated parts of the power-plant and the airplane structure. This guard or shield indicated at 1 may be of any desired configuration and area suitable to the purpose, and is preferably supported from the radiator housing or shell by means of the brackets 2. In the present showing, it will be noted that the guard or shield 1, conforms generally to the shape of the radiator, having an outline of a truncated pyramid. Obviously, the inclined sides will reduce the wind resistance of the guard or shield and will also serve the strengthen the same as well as deflect, and thereby destroy the penetrative force of, any shots or other objects which impinge against their surfaces.

Mounted within the armor plate-guard or shield 1 and in front of the radiator 3, on the crank shaft 5, is a fan 4 which in the present showing is of the suction type, drawing the heated air from the engine space and expelling it around the edges of the guard or shield. Obviously, the fan 4 may be of the blower or any other type and construction suitable to the purpose and may have any desired number of blades.

It will be readily apparent from the construction described that, unlike previous protective devices, the location of the armor-plate guard or shield in front of the radiator will not in any manner decrease the efficiency of the latter as the provision of the fan 4 within the housing or chamber formed by the guard or shield and will serve to enhance the efficiency of the cooling system as a whole.

In the modified form of my invention shown in Figure 3, I have illustrated a method of application to airplane structures where the distance or space between the radiator and propeller is insufficient to permit of the interposition of the guard and fan. In this construction, the guard or shield 1 is mounted in front of the propeller 7, preferably on the crank-shaft end or on a projection carried by the propeller hub 6, the guard or shield being held against rotation by the employment of a ball or roller bearing 8 contained within the hub 1ᵃ of the guard or shield within which the crank-shaft end or propeller hub projection may revolve without transmitting sufficient torque to overcome the inertia of said guard or shield.

The fan 4, which as before stated may be of any suitable type, is fixed to the propeller hub 6, the blades thereof being located in substantially the same plane as the blades of the propeller 7. This arrangement, similar to the structure shown in Figures 1 and 2, improves the efficiency of the cooling system and adequately protects the radiator and adjacent parts of the power-plant, head resistance of the guard or shield, which is in the form of a flat plate or disk, being diminished by fixing thereto a dome 9 of relatively light material of a semi-spherical or other suitable configuration. If desired, the fan 4 may be integral with the propeller, the fan blades and the propellor blades radiating from a common hub.

It will be apparent from the description of the modified form of my invention shown in Figure 3, that the guard or shield 1 when mounted in front of the propeller affords ample protection to the radiator and also protects the hub and contiguous portions of the propeller blades.

While I have described by invention with reference to the specific showing herein, it is evident that various changes in the details of structure may be made without departing from the spirit and scope thereof. For example, the shield 1, as illustrated in Figures 1 and 2, may have its sides extended to completely cover the sides of the radiator casing, and (if desired) a series of small slots or other suitable openings may be provided therein to admit air to the fan chamber.

I claim:

1. A protector for the radiators and adjacent parts of the power-plant and structure of aircraft, comprising a shield of armor positioned in front of the outer-face of the radiator, and a fan mounted to rotate between said shield and the radiator.

2. A protector for the radiators and adjacent parts of the power-plant and structure of aircraft, comprising an armor-plate guard positioned in front of the radiator and spaced therefrom, and a fan mounted to rotate within the space between the radiator and said guard.

3. A protector for the radiators and adjacent parts of the power-plant and structure of aircraft, comprising an imperforate plate of armor spaced from the outer-face of the radiator, and a fan mounted to rotate within said space to impel air through the radiator.

4. The combination with a cooling system for aircraft motors embodying a radiator, of means for protecting said radiator from gun-fire, said means comprising a shield of relatively invulnerable material supported in spaced relation to the plane of the radiator and a fan rotatably mounted between the radiator and said shield.

5. A protector for the radiators and adjacent parts of the power-plant and structure of aircraft, comprising a shield of armor of a configuration and area to substantially conceal said radiator, means for rigidly mounting said shield in front of the radiator to provide an air space between said radiator and said shield, and a fan mounted to rotate within said air space.

6. A protector for the radiators and adjacent parts of the power-plant and structure of aircraft, comprising a metallic guard of a configuration and area to substantially conceal said radiator, brackets for rigidly supporting said guard from said radiator to provide an air space between the radiator and said guard, and a fan housed within said guard.

7. The combination with an aircraft of means for protecting the power-plant thereof, said means comprising a guard of armor-plate positioned between the propeller and the adjacent element of the aircraft power-plant to substantially conceal the latter, and a fan housed within said guard, said fan being synchronized with the propeller.

ANTHONY H. G. FOKKER.